Oct. 14, 1958     W. J. GEER     2,855,913
VALVE ROTATOR

Filed Oct. 22, 1954     2 Sheets-Sheet 1

INVENTOR
William J. Geer
BY
S. C. Thorpe
ATTORNEY

Oct. 14, 1958 W. J. GEER 2,855,913
VALVE ROTATOR
Filed Oct. 22, 1954 2 Sheets-Sheet 2
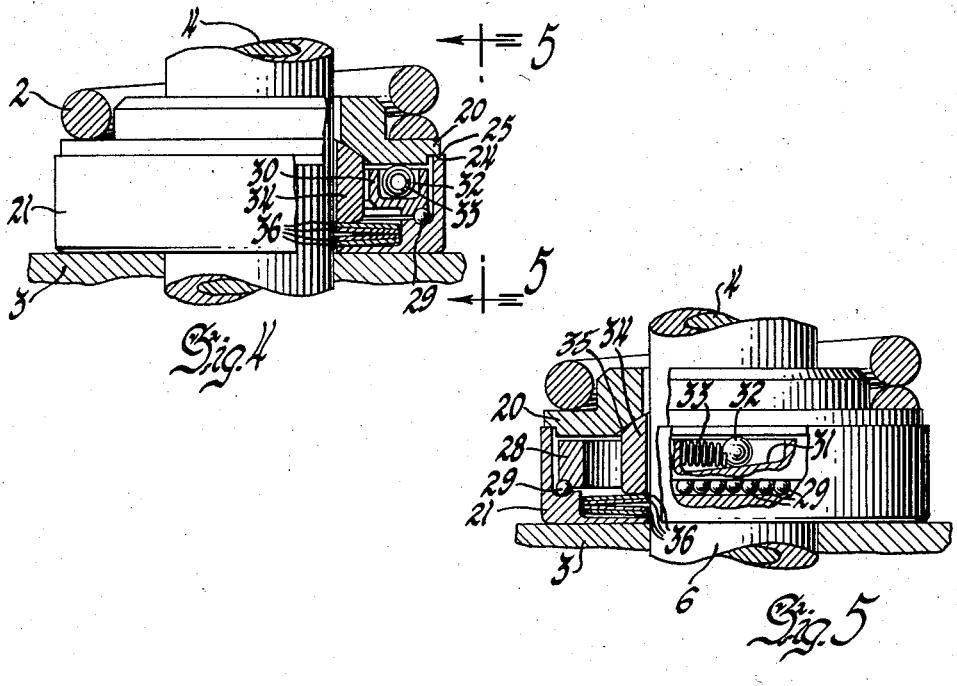
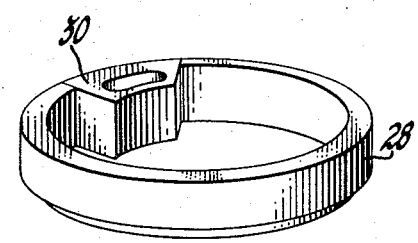
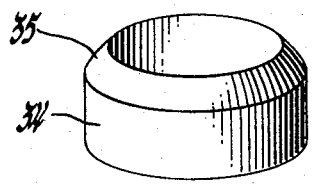
INVENTOR
William J. Geer
BY
J. C. Thorpe
ATTORNEY United States Patent Office 2,855,913
Patented Oct. 14, 1958

2,855,913

VALVE ROTATOR

William J. Geer, Seattle, Wash., assignor to General Motors Corporation, Detroit, Mich., a corporation of Delaware Application October 22, 1954, Serial No. 464,031

8 Claims. (Cl. 123—90)

This invention relates to reciprocating elements such as internal combustion engine poppet valves and particularly to means for inducing rotation of such elements concurrently with their reciprocation.

It is the principal object of my invention to provide a novel and improved form of such a rotator wherein a washer-like member is caused to rock or pivot in response to the thrust imposed on the reciprocated element in operation, which rocking or pivoting movement varies progressively in a direction about the washer axis with the result that the washer is induced to axially rotate in a manner similar to that observed when a coin or other disk is freely dropped on a table. The transmission of such rotation to the reciprocating element may be either direct, i.e., through a rigid connection between them, or through a return spring biasing the element in one direction.

The means for carrying out this object of my invention will be readily apparent from the following description of one preferred embodiment selected for illustrative purposes, having reference to the drawings wherein:

Figure 4 is a view generally similiar to Figure 2 but showing the parts in their relative valve open positions.

Figure 5 is a view generally similar to Figure 3, but taken from line 5—5 of Figure 4.

Figures 6 and 7 are perspective views of detail parts of the rotator.

Figure 1:
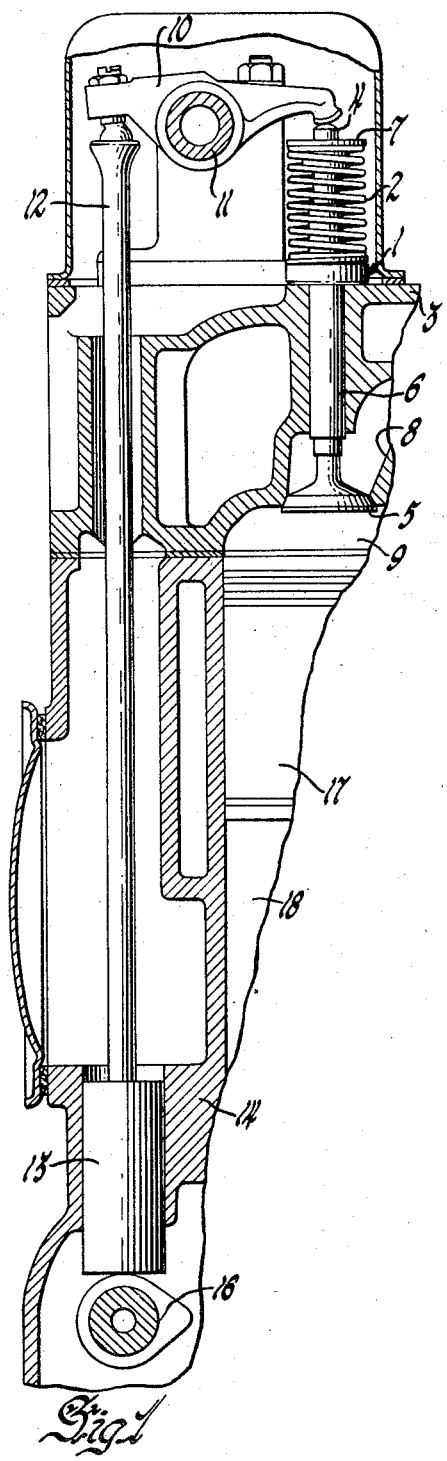
Figure 1 is a transverse view through a portion of an internal combustion engine of the overhead poppet valve type, with parts broken away and in section to show my valve rotator located between the poppet valve return spring and the cylinder head.

Referring now in detail to the drawings, the rotator designated generally by the numeral 1 is shown in Figure 1 as inserted between the poppet valve return spring 2 and the engine cylinder head 3 which serves as the retaining means for one end of the spring 2. The stem 4 of the poppet valve 5, which is slidably and rotatably mounted in a guide 6 in the cylinder head, has a washer 7 fiixed thereto adjacent its upper end and serving as a second retaining means for the return spring 2. It will be appreciated that the rotator 1 could alternatively be inserted in thrust between the spring 2 and this second retaining means or washer 7.

The poppet valve 4 may be reciprocated in any desired manner to control the opening of the valve port 8 to the engine combustion chamber, and I have illustrated this being accomplished by a rocker 10 mounted for oscillation on a shaft 11 supported on the cylinder head 3. The respective opposite ends of the rocker engage the upper ends of the valve stem and a push rod 12. The lower end of the push rod engages a tappet 13 slidably mounted in the engine crankcase 14 and riding on a cam 16 which is suitably driven in timed relation with the working of the engine piston 17 in its cylinder bore 18.

Figure 2:
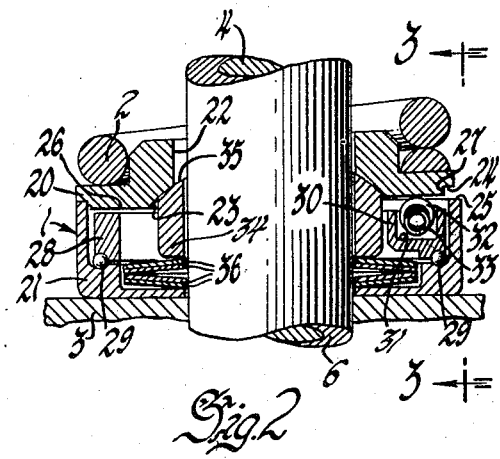
Figure 2 is an enlarged fragmentary view similar to Figure 1 showing the valve rotator in transverse section, with its parts and the adjacent engine parts in their relative positions when the poppet valve is closed.
Figure 3:
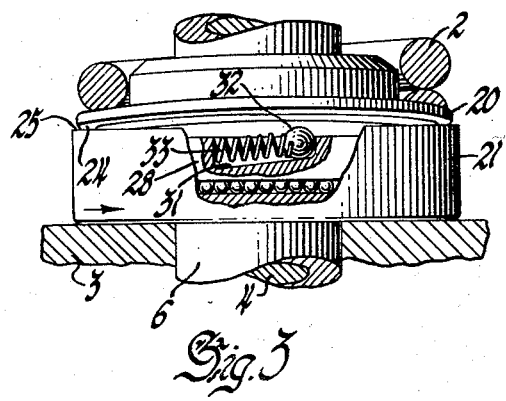
Figure 3 is an elevational view taken from the line 3—3 of Figure 2 with portions of the rotator and associated engine parts broken away and in section.

Referring now particularly to Figures 2 and 3, the rotator is shown as including upper and lower members 20 and 21 which are relatively rotatable and axially movable of each other on the axis of the valve stem 4. The upper member 20 is in the form of a washer against the upper surface of which is seated the valve return spring 2. The internal diameter of the upper member 20, as defined by the opening 22, is sufficiently large to accommodate its substantial angular misalignment relative to the valve stem. The bottom of the upper member adjacent the opening 22 is provided with a spherically concave bearing surface 23, and is provided adjacent its outer periphery with a substantially flat annular thrust surface 24 which is adapted to seat on the abutment surface 25 of the lower member 21. The annular thrust surface 24 is recessed somewhat from the main bottom surface 26 of the upper member to form a shoulder 27 which is engageable with the upper internal periphery of the lower member 21 to limit their relative lateral misalignment.

The lower member 21 rests on the upper surface of the cylinder head 3 surrounding the valve stem, and constitutes the lower raceway member of a thrust bearing. The upper raceway member of this thrust bearing is indicated at 28, and it and the lower member 21 are in anti-friction bearing engagement with each other through a plurality of balls 29 whereby the upper raceway member 28 is free to rotate about the valve stem 4.

The upper raceway member 28 forms part of a shiftable means which applies a thrust to the washer 20 eccentrically of the valve stem axis, tending to tilt the washer out of angular alignment with the valve stem. For this purpose, the upper raceway member 28 is provided with a segmental element 30 (Figure 6) in which is formed an upwardly facing groove extending concentrically of the central axis and having an inclined bottom wall 31. Within this groove and adapted to roll on the bottom wall 31 is a ball 32 which constitutes a shiftable element tending to oppose downward movement of the washer 20 during the opening movement of the poppet valve. Biasing the ball 32 toward the shallower end of the groove is a small compression spring 33 reacting against the groove end wall at its deeper end. The inclined groove bottom wall 31 will thus be seen to act as a cam surface for the ball as a follower, such that when the ball is forced toward the deeper end of its groove in opposition to the force applied to it by the small spring 33 the ball will roll on the groove bottom wall 31 and on the under surface of the washer 20 with the result that the upper race member 28 will rotate on the lower raceway member 21.

The main thrust load of the valve return spring is transmitted to the lower member 21 by a ring 34 (best shown in Figure 7) having a spherical upper end face 35 which rockably journals the spherical bearing surface 23 of the washer 20. Supporting the ring 34, in turn, are one or more belleville springs 36 which rest on and fixedly clamp the lower member 21 to the cylinder head, as shown. These belleville springs 36 have a strength somewhat exceeding the thrust of the valve return spring 2 when the valve is in closed position, but less than the increased thrust of the return spring 2 when the valve is in open position.

In operation, as the valve 5 is opened with each lifting stroke of the engine cam 16 acting through the tappet 13, push rod 12 and rocker 10, the belleville springs 36 yield sufficiently to allow the washer 20 to move downward until its surface 24 seats with full mating engagement on the surface 25 of the lower raceway member 21. In so moving downward, the washer 20 is yieldably opposed by the ball 32 whose rolling movement down the inclined groove bottom 31 is opposed by the small spring 33 with sufficient force that the washer 20 is initially tilted as shown in Figures 2 and 3. During its continued downward movement the ball 32 is displaced against its spring 33 with the result that the upper raceway member 28 is rotatably indexed in the direction of the arrow (Figure 3) about the valve stem, and the ball simultaneously rolls in the opposite direction on the under surface of the washer 20. The direction of tilt of the washer 20 during each such valve opening stroke is, of course, determined by the relative angular position of the ball 32 about the valve stem axis. On each succeeding valve closing stroke, the belleville springs again raise the ring 34 and washer 20 to their elevated position, allowing the small spring 33 to again position the ball 32 at the shallow end of its groove. Due to the indexing of the raceway member 28 during the preceding valve opening stroke, however, the location of the ball 32 about the valve stem axis is further to the right of its position shown in Figure 3 than at the start of the preceding cycle. It will be apparent that the indexing of the raceway member 28 and consequent relocation of the ball member 32 about the valve stem continues progressively with each succeeding cycle of valve reciprocation, thereby providing a corresponding progressive change in direction of tilt of the washer 20, resulting in the washer undergoing a rolling movement on the upper end surface 25 of the lower raceway member 21. Such rolling movement, in turn, produces or is accompanied by a slow positive axial rotation of the washer, which rotation is transmitted through the return spring 2 and the upper retaining means 7 to the valve stem 4.

While only a single preferred embodiment of the invention has been disclosed, it is appreciated that numerous minor changes in the construction and arrangement of the parts may be made without departing from the spirit and scope of the invention as defined in the following claims.

I claim:

1. In a device adapted to be inserted in thrust transmitting relation between one end of a poppet valve coaxially operating return spring and a retaining means for said spring to induce progressive rotation of the valve during reciprocation, comprising a member having an end seating surface for the valve spring and an annular surface on its opposite end operatively engageable with the spring retaining means, shiftable means yieldably maintaining one side of said seating member displaced longitudinally of the valve axis relative to its diametrically opposite side, said shiftable means including a first element, means for rotatably supporting said first element on the spring retaining means, resilient means carried by said first element, and a second element biased by said resilient means into thrust bearing engagement with said member, said first and second elements being in bearing engagement with each other on a plane inclined to induce their relative rotation about the valve in response to yielding of said resilient means under increased thrust of the valve return spring, and means operative longitudinally of the valve to displace said member from said one element when the valve return spring thrust is decreased.

2. A device for insertion in thrust transmitting relation between two parts for inducing relative rotation of the parts about an axis in response to their relative movement in one direction along said axis, comprising two relatively rockable members relatively rotatable about and movable along said axis and having coacting thrust transmitting annular surfaces, and shiftable means acting yieldably in thrust between said members in laterally offset relation to said axis including a first element rotatable on one of said members, resilient means reacting tangentially of said axis against said first element, and a second element rotatable on the other of said members and urged into rotary bearing engagement therewith by said resilient means, said first and second elements being in bearing engagement with each other on a plane inclined to induce relative movement therebetween about said axis in response to axial movement of the elements by said members in opposition to said resilient means.

3. A device for effecting relative rotation between two parts in response to axial thrust loading of one by the other, comprising two members adapted to be mounted for relative rotation and axial and rocking movement and having opposed thrust transmitting annular surfaces in normally inclined relation to each other, shiftable means reacting in thrust against each of said members in laterally offset relation to their axis of relative rotation to yieldably prevent mating engagement of said surfaces, said shiftable means being mounted on one of said members and reacting helically of said axis against the other member for rotation about said axis in response to increased axial thrust loading of the members whereby said members in seeking mating engagement of their annular surfaces are induced to rotate relative to each other.

4. A device for inducing intermittent unidirectional rotation between two parts in response to alternately increasing and decreasing thrust application to one of the parts longitudinally of the axis of rotation, comprising two relatively rotatable and axially movable members having coacting annular thrust surfaces, a third member having a bearing surface rockably journalling one of said first named members for angular movement into and out of alignment with said axis, first resilient means thrustably interposed between said third member and the other of said first named members and yieldable under the maximum thrust load applied to said one member, and second resilient means thrustably interposed between said two first named members in laterally offset relation to said axis for urging said one member to rock on said bearing surface and thereby effect a divergent relation of said annular thrust surfaces when said maximum thrust load is relieved, said second resilient means being yieldable to permit rocking movement of said one member into mating engagement of said annular thrust surfaces in response to re-application of said maximum thrust load, said second resilient means including elements in cammed relation with each other and in respective rotary bearing relation with said first two named members to effect their progressive indexing about said axis with each cyclic application and relieving of said maximum thrust load.

5. A device adapted to be inserted between one end of a return spring for a reciprocably actuated part and a spring retaining means for effecting progressive axial rotation of said part relative to said retaining means in response to cyclic increasing and decreasing loads on the spring in operation, comprising a spring seating washer, thrust bearing means for transmitting spring thrust from the washer to said retaining means including a first raceway member adapted to fixedly seat on the retaining means, a second raceway member rotatively bearing on said first raceway member, said second raceway member having a cam surface disposed opposite the washer, a shiftable element thrustably interposed between said cam surface and the washer, a second spring urging said shiftable element away from said second raceway member and against the washer with sufficient force to tilt the washer out of axial alignment with said raceway members when said return spring load is relatively low, said first raceway member having an annular seating surface substantially normal to its axis and engageable by the washer under thrust of said return spring, said second spring being yieldable under the increased thrust of the washer when said return spring load is relatively high whereby said second raceway member is cammed rotatively of said axis by said shiftable element and the direction of tilt of the washer is rotated progressively about said axis as said return spring yields in opposition to movement of said reciprocably actuated part, and a third spring thrustably supporting said washer from said first raceway member and yieldable under said high return spring load.

6. The combination with a poppet valve having a stem, fixed means supporting the stem for reciprocating and axial rotation and a valve return spring reacting in thrust against said means, of a device for inducing progressive rotation of the stem in response to cyclic increase and decrease in thrust imposed on the spring during reciprocation of the valve, said device comprising a pair of members having annular coengaging thrust surfaces and oppositely disposed surfaces adapted to abut the return spring and said fixed means, a counterbore in one of said members opposite the other member, a belleville spring seated against said one member in said counterbore, a ring seated against said belleville spring and having a generally spherical end surface facing the other member, said other member having a bearing surface conforming to and seated for universal pivotal movement on said end surface, and shiftable means rotatably bearing one on of said members and acting resiliently in thrust against the other member on one side of said ring, said shiftable means including a cam, a follower and means biasing the follower along the cam toward the other member.

7. In a device adapted to be inserted in thrust transmitting relation between a poppet valve coaxially operating return spring and a retaining means for said spring to induce progressive rotation of the valve during reciprocation, comprising a seating washer for the return spring having an annular surface operatively engageable in thrust with said retaining means, resilient means opposing thrust engagement of said surface with said retaining means but yieldable under maximum operating thrust of the return spring, said washer having its internal diameter of sufficient size to accommodate substantial tilting of its axis relative to the valve stem, and shiftable means operatively rotatable on said retaining means and biasing the washer to a tilted position, said shiftable means including relatively spring biased elements havng thrust surfaces coacting under the thrust of said return spring during valve opening to rotatively index one of said elements about the valve stem whereby the direction of washer tilt is progressively turned in response to valve reciprocation.

8. In a device adapted to be inserted in thrust transmitting relation between a return spring for a reciprocably actuated part and a spring retaining means for effecting progressive rotation of said part during its reciprocation, comprising a spring seating washer having its face oppositely of the spring provided with a spherical bearing surface adjacent its inner marginal edge and a substantially flat bearing surface outwardly of said spherical bearing surface, a thrust bearing opposite said flat bearing surface including raceway members with anti-friction balls therebetween, one of said raceway members being adapted to seat fixedly on said spring retaining means and having a portion embracing the other raceway member and terminating opposite the washer with an annular abutment surface for said flat bearing surface, a ring having a spherical end face journalling said spherical bearing surface for universal pivotal movement of the washer relative to said thrust bearing, a belleville spring thrustably spacing said ring from said one raceway member, said belleville spring being yieldable under the maximum thrust to be imposed on the washer by the return spring but having sufficient strength to effect disengagement of the washer from said one raceway member when the return spring thrust is reduced, said other raceway member having a helically inclined groove facing the washer, a ball rollably seated in said groove, and a spring disposed in the deeper end of said groove and biasing said last named ball into wedging relation between the shallower end of the groove and the washer.

References Cited in the file of this patent

UNITED STATES PATENTS 2,582,060　　Newton ---------------- Jan. 8, 1952

FOREIGN PATENTS 82,062　　Austria ---------------- Dec. 27, 1920